Figure 1:
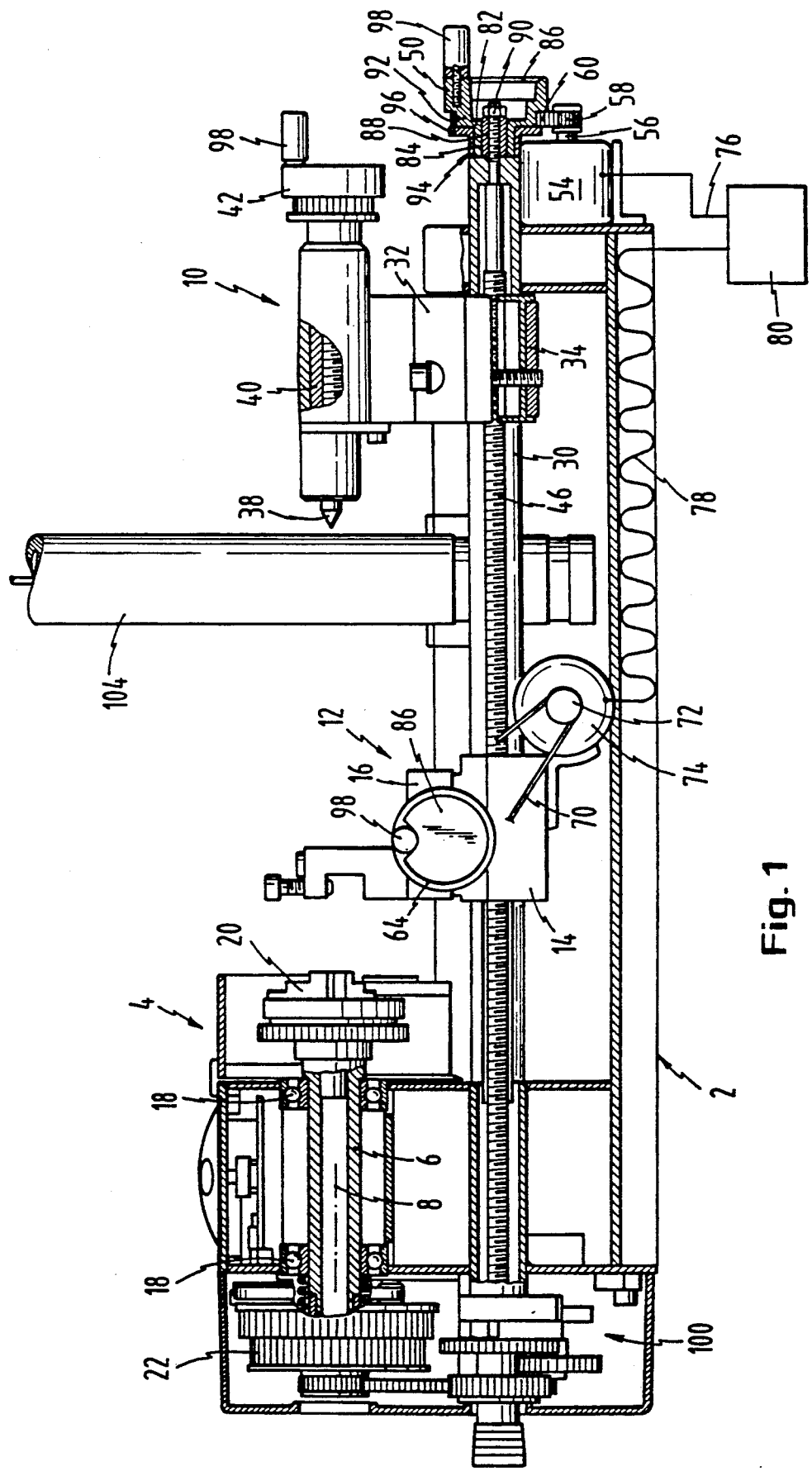

United States Patent [19]
Mair et al.

[11] Patent Number: 5,090,278
[45] Date of Patent: Feb. 25, 1992

[54] LATHE

[75] Inventors: Hans Mair, Bischofshofen; Johan Reiner, Ramsau, both of Austria

[73] Assignee: Emco Maier GmbH, Hallein, Austria

[21] Appl. No.: 577,687

[22] Filed: Sep. 4, 1990

[30] Foreign Application Priority Data

Sep. 6, 1989 [DE] Fed. Rep. of Germany ....... 3929659

[51] Int. Cl.$^5$ ........................ B23B 3/00; B23B 21/00
[52] U.S. Cl. ....................................... 82/117; 82/132; 409/240
[58] Field of Search ................. 82/115, 117, 116, 132, 82/137, 141, 173, 118, 112; 409/240

[56] References Cited

U.S. PATENT DOCUMENTS

| | | | |
|---|---|---|---|
| 3,442,164 | 5/1969 | Blazek | 82/117 |
| 4,044,650 | 8/1977 | Lyon et al. | 409/240 X |
| 4,255,991 | 3/1981 | Lambert | 82/118 |
| 4,478,116 | 10/1984 | Fuller | 82/137 X |
| 4,506,570 | 3/1985 | Wood et al. | 82/112 |

*Primary Examiner*—Steven C. Bishop

[57] ABSTRACT

A lathe with a machine bed, a main spindle stock for a motor driven main spindle fixed to the machine bed, a tail stock moveable in the direction of the main spindle axis, and a cross table including a longitudinal table moveable in the direction of the main spindle axis and a transverse table transversely moveable relative to the longitudinal table, with the longitudinal table being operable by a rotatable longitudinal lead screw and with the transverse table being operable by a rotatably drivable transverse lead screw. The longitudinal lead screw and the transverse lead screw are each provided with a hand wheel, which hand wheel is rigidly connected with a driving wheel couplable to an associated drive motor. The drive motors are controllable by a data processor. Moreover, a vertical spindle pedestal with a motor driven vertically adjustable vertical spindle can be fastened to the machine bed, with the adjusting drive for the vertical spindle comprising a vertical lead screw with a hand wheel, which hand wheel likewise is rigidly connected with a drive wheel couplable to an associated numerically controlled drive motor.

4 Claims, 3 Drawing Sheets

LATHE

The invention concerns a lathe of the type having a machine bed, a main spindle stock for a motor driven main spindle fixed to the machine bed, a tail stock arranged on the machine bed for sliding movement in the direction of the main spindle axis, and a cross table including a longitudinal table adjustable in the direction of the main spindle axis and a cross table on the longitudinal table adjustable transversely of the main spindle axis, with the longitudinal table being drivable by a longitudinal lead screw and the transverse table being drivable by a transverse lead screw.

Generally a part to be turned is placed between the main spindle and the tail stock of such a lathe and is rotated by the main spindle about its longitudinal axis. A turning bit or the like is fastened to the transverse table of the cross table which turning bit can be driven perpendicularly to the work piece axis by the movement of the transverse table and can be driven parallel to the work piece axis by the movement of the longitudinal table, so that a rotational machining of the work piece can be accomplished in the customary way.

The longitudinal lead screw and the transverse lead screw in the case of simple lathes, especially small table or hobby lathes, are actuated by means of hand wheels, each of which is rotatably fixed to one end of the associated lead screw. Generally with such lathes only simple rotational machining is carried out so that simultaneously overlapping and exactly coordinated movements of the longitudinal table and of the transverse table are not necessary.

Highly automated lathes of generic type are already known in which the longitudinal lead screw and the transverse lead screw are each activated by a numerically controlled positioning motor. The high technical and financial expense of modern NC controls and NC drives makes them worthwhile in general only for Production machines with high metal removal rates and exceedingly high production accuracy. These properties required for modern production machines demand moreover that the NC control and the NC drives be of a corresponding modern state of the art and they are therefore correspondingly expensive. Such controls and drives are therefore unsuited for use in small lathes for workshops or home work areas since they would unacceptably increase the price of the actual machine tool.

In general there are also already known machine tools in which the feed spindles are operable either by hand wheels or by controlled drive motors. In these cases the drive motors, for example, are arranged at the end of the associated lead screw at the end facing away from the hand wheel or the introduction of the turning movement of the drive motor results somewhere between the two lead screw ends through a drive system coupled with the lead screw. In each case the lead screw must be constructed in an expensive way to suit the possibility that it may be driven either by a hand wheel or by a controlled motor. In this situation it must especially be seen to provide that in the case of long duration manual operations the drive motor can be separated from the lead screw so that it is not constantly moved along with the lead screw. To achieve this result expensive electrical or mechanically operated coupling devices are generally employed. Especially in the case of lathes of the type described in the first paragraph above there exists a special disadvantage for the application of a drive motor to the end of the lead screw facing away from the hand wheel since at this end a drive is generally provided by means of which the longitudinal lead screw is couplable with the drive of the main spindle to, for example, turn threads or to perform other helical machining operations.

The object of the present invention is to provide a lathe of the type mentioned in the first paragraph above which in a simple and economical realization is suited for a manual and a motor driven operation at least of the longitudinal and transverse tables.

This object is solved in accordance with the invention by the longitudinal lead screw and the transverse lead screw each being equipped with a hand wheel to which is rigidly connected a drive wheel couplable to an associated drive motor. That is, the hand wheel of each lead screw is directly rigidly connected with a drive wheel through which the turning movement of an associated drive motor can be introduced.

With the solution of the invention further interventions into the construction of the machine are not required. The drive motors can for example be fastened in a simple way with their axes parallel to the associated lead screws to the parts which support the lead screws so that the hand wheels can be connected with the associated drive motors by means of extremely simple drive arrangements. Since the manual drive as well as the motor drive is introduced to a lead screw through its hand wheel the support of the lead screw need only at its hand wheel carrying end be designed to accommodate the transverse force which appears with the introduction of the turning movement.

In a further implementation of the lathe of the invention a vertical spindle pedestal with a motor driven vertically adjustable vertical spindle is fastenable to the machine bed with the adjusting drive for the vertical spindle including a vertical lead screw with a hand wheel which like the hand wheels for the cross table is rigidly connected with a drive wheel couplable with an associated positioning motor. In this way the lathe by using the above-described principles of the invention can be expanded in a simple way into a vertical drilling and milling machine with a motorized vertical spindle feed.

The hand wheels are in each case arranged on the machine in positions readily accessible by the operator. In a correspondingly simple construction of the drive arrangement the connection between the drive motor and the associated hand wheel can be made in an easy way or can be again easily unmade. Therefore in the case where a manual feed actuation is to be carried out the drive motors can be decoupled from the lead screws in a simple way so that they are not moved along with the manual feed operation. Special coupling devices for this selective coupling or decoupled of the drive motors are not necessary.

In a preferred embodiment of the invention, the drive wheel is formed of one piece with the hand wheel. Such a construction allows the hand wheel to be made in a simple and price effective way especially by precision injection casting or similar manufacture.

Likewise in the sense of a constructive simplification the drive wheel is formed as a toothed belt pulley which through a toothed belt is connected to a toothed pinion mounted on the output shaft of the drive motor. This assembly and connection of the drive motor with the hand wheel through a toothed belt can be carried out with workshop means and can also be easily performed by home workers without special equipment.

In a lathe in which a handle is arranged a known way on each hand wheel, the hand wheel in accordance with the invention is removably fastened to the hand wheel so that during motorized feed drive it can be removed.

The drive motors for the lead screws can in their simplest version can he electric motors switchable on and off by switches. In a Preferred embodiment of the invention it is, however, provided that the drive motors are controllable by a numerical control apparatus so that the machine can automatically carry out controlled work programs for complicated work contours in which case the movement of the longitudinal table, of the transverse table and if need be of the vertical spindle can be simultaneously coordinated With one another. As the numerical control apparatus a data processor of the size of a personal computer is preferably provided which not only serves for the displacement control of the drive motors but also for their power control.

The drive motors are in accordance with one embodiment of the invention formed as step motors with integrated brakes. After the switching off of the supplied current the brakes are automatically operated so that the motors are essentially braked without reverse movement. In another embodiment of the invention the forward movement and the braking of the step motors is controlled by the numerical control apparatus with the numerical control apparatus outputting pulses at increasing or decreasing frequencies corresponding to the desired drive process or braking process for the step motors.

An exemplary embodiment of the invention is illustrated in the drawings and described in the following description in more detail. The drawings are:

FIG. 1—A side view of a lathe with hand wheels and drive motors for the longitudinal lead screw as well as for the transverse lead screw.

Figure 2:
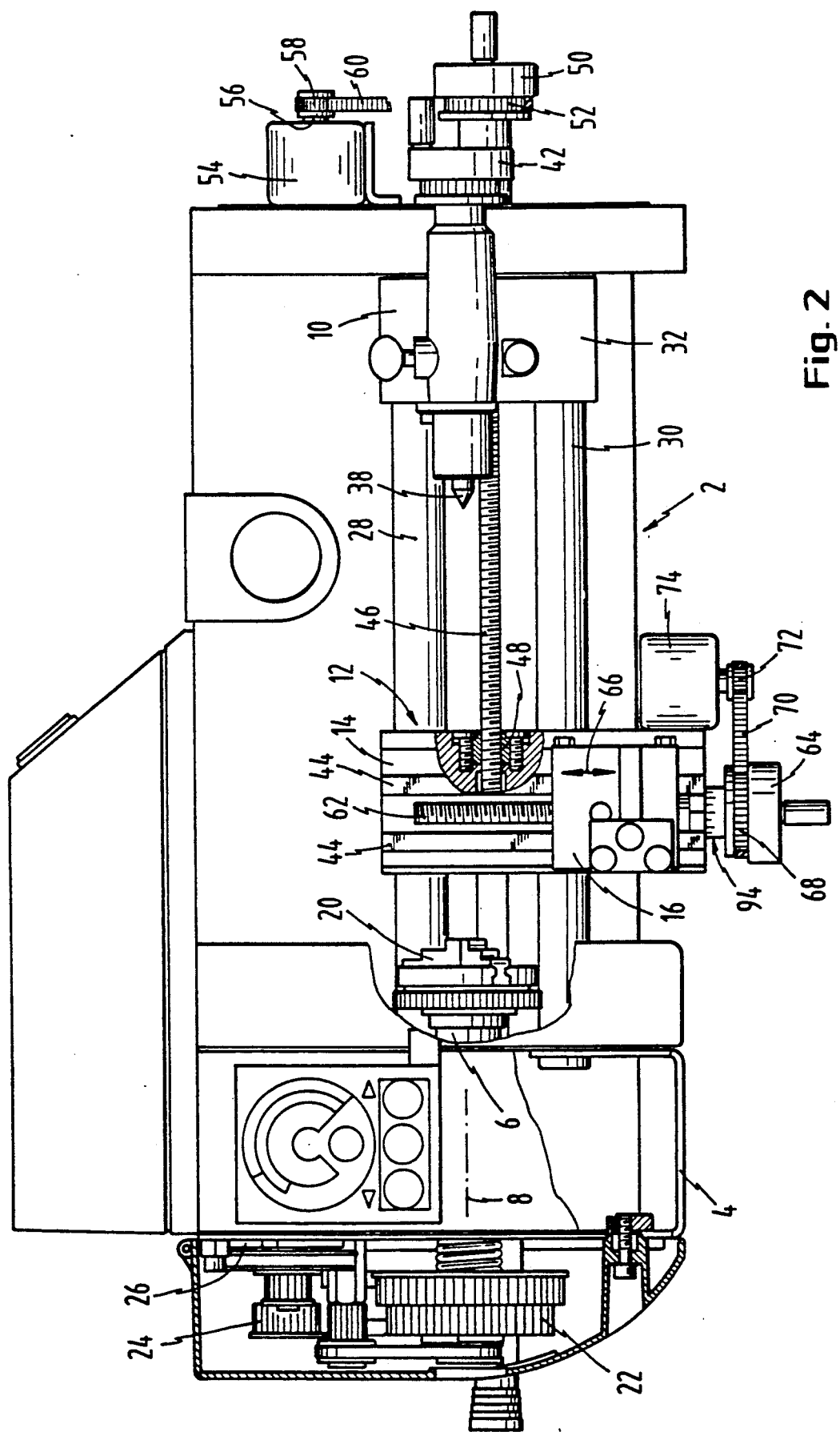
Figure 3:
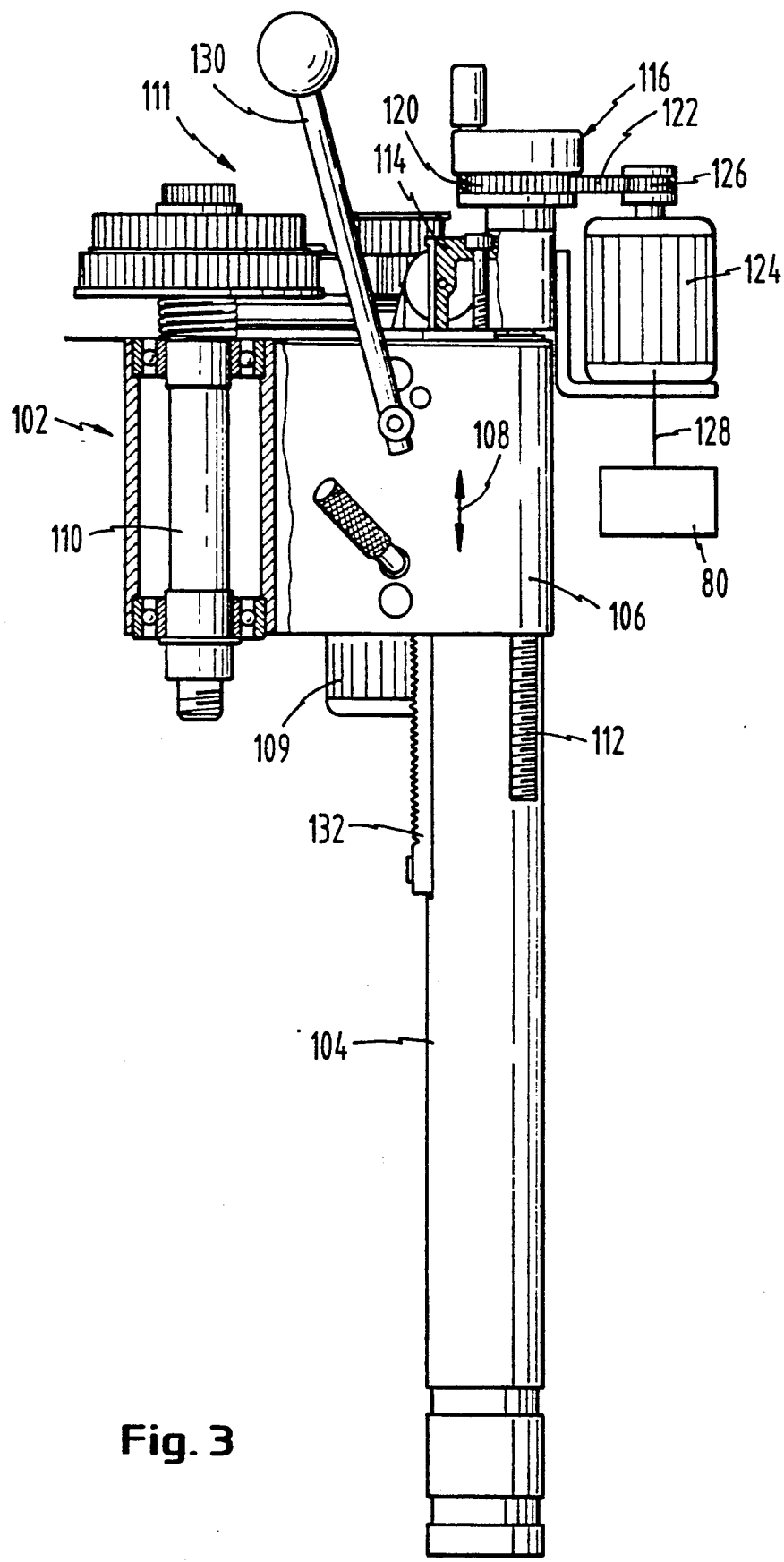

FIG. 2—A plan view of the lathe of FIG. 1. FIG. 3—A side view of a vertical spindle pedestal with a hand wheel and a drive motor for the vertical lead screw which vertical spindle pedestal is attachable to the lathe as illustrated in FIG. 1.

The lathe illustrated in FIGS. 1 and 2 includes a machine bed 2, a main spindle stock 4 for a motor driven main spindle 6 fixed to the machine bed, a tail stock 10 supported on the machine bed 2 for longitudinal shifting movement in the direction of the main spindle axis 8, and a cross table 12 arranged between the main spindle 6 and the tail stock 10 and having a longitudinal table 14 slidable in the direction of the main spindle axis 8 and a transverse table 6 slidable transversely relative to the longitudinal table 14.

The main spindle 6 is supported rotatably in the main spindle stock 4 by bearings 18. On its right-hand end as seen in FIGS. 1 and 2 the main spindle 6 carries a work piece chuck 20 in which a non-illustrated part to be turned can be clamped in the usual way. The main spindle 6 at its left-end as seen in FIGS. 1 and 2 carries a belt pulley arrangement 22 connected by a drive belt with a belt pulley arrangement 24 fixed to the output shaft of a spindle drive motor 26 fixed to the main spindle stock 4.

The tail stock 10 is slidable on two parallel guide rods 28, 30 running in the direction of the main spindle axis 8. For this the tail stock 10 is equipped with an upper bearing shell arrangement 32 and a lower bearing shell arrangement 34 Which shells are connected with one another by connecting screws 36 and are so tensioned toward one another that the tail stock 10 is fixedly clamped to the guide rods 28, 30. The tail stock center 38 is supported in a spindle sleeve 40 which can be driven in or out in the direction of the tail stock center axis by means of a hand wheel 42.

The cross table 12 includes a lower longitudinal table 14, which like the tail stock 10 is slidably supported on the guide rods 28, 30, as well as an upper transverse table 16 which is slidably supported on the longitudinal table by transverse ways 44 arranged on the longitudinal table.

A longitudinal lead screw 46, parallel to the guide rods 28, 30 and rotatably supported by the machine bed 2, serves to shift the longitudinal table 14, this lead screw having an external thread cooperating with the internal thread of a lead screw nut 48 fixed to the longitudinal table 14. Upon rotation of the longitudinal lead screw 46 the longitudinal table 14 is moved in the direction of the main spindle axis 8. Fixed to the right end of the longitudinal lead screw 46, as seen in FIGS. 1 and 2, is a hand wheel 50 by means of which the longitudinal lead screw 46 can be manually rotated. A section of the hand wheel 50 is formed as a toothed belt pulley 52. A drive motor 54 is arranged on the right forward side of the machine bed 2, as seen in FIGS. 1 and 2, so that its output shaft 56 is directed parallel to the longitudinal lead screw 46. A toothed pinion 58 is on the output shaft 56. The toothed Pinion 58 is rotatably connected with the toothed belt Pulley 52 of the hand wheel 50 by a toothed belt 60.

For the transverse shifting of the transverse table 16 a transverse lead screw 62 is provided and is rotatably supported on the longitudinal table 14. A hand wheel 64 is fastened to the lower end of the transverse lead screw 62, as seen in FIG. 2, by means of which hand wheel the transverse lead screw 62 is manually rotatable. The transverse lead screw 62 has an external thread which engages the internal thread of a lead screw nut fastened to the transverse table so that upon rotation of the transverse lead screw 62 the transverse table is moved in the direction of the double arrow 66. A section of the hand wheel 64 is formed to provide a toothed belt pulley 68 which through a toothed belt 70 is rotatably connected with a toothed pinion 72 of a drive motor 74 fastened to the longitudinal table 14.

As especially shown by FIG. 1, the drive motor 54, through a conductor 76, and the drive motor 74, through a conductor 78, are connected with a programmable data processor 80 which on one hand effects the displacement control and on the other hand effects the power control for the drive motors 54 and 74 which are formed as step motors. The conductor 78 is formed as a so-called drag cable Which permits the drive motor 74 to travel with the longitudinal table 14.

The hand wheels 50 and 64 (and for reasons of standardization also the hand wheel 42) are similarly constructed. This construction is by way of example described with reference to the hand wheel 50. This wheel is essentially formed with a cup shape with the cup bottom 82 which faces the associated lead screw transitioning into a receiving hub 84 which is Passed over the end of the lead screw 46 and non-rotatably fastened to it. The cup opening which faces away from the lead screw 46 is covered by a cover 86. The receiving hub 84, through the intermediary of a connecting sleeve 88, is non-rotatably connected with the lead screw 46 by means of a fastening nut 90. As can be seen in FIG. 1 the fastening nut 90 and the end of the longitudinal lead screw 46 are located in the interior of the cup which is closed by the cover 86 from the outside environment. This solution is in keeping with safety requirements and is also visually pleasing.

The toothed belt Pulley 52 is formed on a toothed belt portion 92 of the hand wheel 50 directly following the receiving hub 84. On the receiving hub 84 is a scale ring 92 which is frictionally supported on the hub 54 and is rotatable relative to it. The scale ring has a flange 96 having an outside diameter greater than the diameter of the toothed belt section 92. The flange 96 borders the toothed belt section 92 on one side. The other side of the toothed belt portion 92 is bordered by a correspondingly stepped formation of the hand wheel 50 so that the toothed belt 60 is securely held to the toothed belt portion 92. As can especially be seen in the hand wheel 64 of FIG. 2, the scale ring 94 is provided with a scale marking which in the customary way cooperates with an opposite mark. The scale ring 94 is rotatable against the frictional resistance of the receiving hub 84 in order to adjust the scale to a desired position.

Each of the hand wheels is provided with a handle 98, which in the case of a lengthy amount of work without manual feed control can be removed so that the operator is not endangered by the rotating hand wheel.

A drive and coupling device 100 is arranged on the end of the longitudinal lead screw 46 facing away from the hand wheel 50 which device permits the coupling of the longitudinal lead screw 46 to the main spindle 6 with different transfer ratios. Thereby helical machining of a Work Piece clamped to the main spindle 6 can be accomplished in a way known in itself, such helical machining requiring that the longitudinal movement of the longitudinal table 14 have a definite relationship to the rotational movement of the main spindle 6. The drive and coupling arrangement 100 therefore makes possible a helical working with different helix inclinations.

FIG. 3 shows a vertical spindle pedestal 102 which is insertable in the machine bed 2 in the way illustrated in FIG. 1. The vertical spindle pedestal 102 includes a vertical column 104 on which a spindle housing 106 is supported for sliding movement in the direction of the double arrow 108. A vertical spindle 110 is supported in the spindle housing 106 and is drivable by a motor 109 through a belt pulley arrangement 111, a work tool being clampable in the vertical spindle 110.

The means for adjusting the spindle housing 106 includes a vertical lead screw 112 which is supported for rotation and against axial sliding movement by a bearing block 114 arranged at the upper end of the vertical column 104. A hand wheel 116 is non-rotatably fixed to the upper end of the vertical lead screw 112. This hand wheel 116 corresponds to the hand wheel 50 described in detail in connection with FIG. 1 and therefore does not need to be described again.

The vertical lead screw 112 is provided with an external thread which cooperates with the internal thread of a spindle nut 118 fixed to the spindle housing 106, so that upon rotation of the vertical lead screw 112 the spindle housing 106 is moved along the length of the vertical column 104.

The toothed belt pulley 104 formed of one piece with the hand wheel 116 is rotatably connected with a toothed pinion 106 carried by the output shaft of a drive motor 124. The drive motor 124 is in the present embodiment mounted on the bearing block 114.

The drive motor 124 is also connected with the data processor 80 through a conductor 128 so that the data processor carries out the displacement control and the power control of the drive motor 124, so that the feed movement of the vertical spindle 110 can also be performed automatically.

The hand lever 130 is connected with an associated toothed pinion located inside of the spindle housing 106, which pinion cooperates with a rack 132 fastened to the vertical column 104. By pivotal movement of the hand lever the spindle housing 106 together with the vertical spindle can be vertically adjusted, for example, during a drilling operation.

We claim:

1. A lathe with a machine bed, a main spindle stock for a motor driven spindle fixed to the machine bed, a tail stock slidable in the direction of the main spindle axis, and a cross table including a longitudinal table moveable in the direction of the main spindle axis and a transverse table moveable transversely relative to the longitudinal table, the longitudinal table being moveable by a rotationally drivable longitudinal lead screw and the cross table being moveable by a rotationally drivable transverse lead screw, characterized in that the longitudinal lead screw and the transverse lead screw are each equipped with a hand wheel which hand wheel is rigidly connected with a drive wheel couplable to an associated positioning motor and which hand wheel is essentially of cup shape to define a cup shaped opening, with the bottom of the cup facing the lead screw transitioning into a receiving hub which is passed over an end of the lead screw and non-rotatably fixed to it by parts located in the cup shaped opening, and wherein the cup shaped opening facing away from the lead screw is closed by a cover.

2. A lathe according to claim 1 wherein a handle is arranged on each hand wheel and characterized in that the handle is removably fastened to the hand wheel.

3. A lathe with a machine bed, a main spindle stock for a motor driven spindle fixed to the machine bed, a tail stock slidable in the direction of the main spindle axis, and a cross table including a longitudinal table moveable in the direction of the main spindle axis and a transverse table moveable transversely relative to the longitudinal table, the longitudinal table being moveable by a rotationally drivable longitudinal lead screw and the cross table being moveable by a rotationally drivable transverse lead screw, characterized in that the longitudinal lead screw and the transverse lead screw are each equipped with a hand wheel which hand wheel is rigidly connected with a toothed belt pulley couplable to an associated positioning motor by a toothed belt, the toothed belt pulley being formed by a toothed belt section of the hand wheel directly following the receiving hub, and a scale ring on the receiving hub frictionally connected with the receiving hub and rotatable relative thereto, which scale ring has a flange with an outside diameter greater than the diameter of the toothed belt section of the hand wheel and which flange borders one side of the toothed belt section.

4. A lathe according to claim 3 wherein a handle is arranged on each hand wheel and characterized in that the handle is removably fastened to the hand wheel.

* * * * *